United States Patent
Mashino et al.

(10) Patent No.: US 11,874,132 B2
(45) Date of Patent: Jan. 16, 2024

(54) DISPLAY CONTROL METHOD AND APPARATUS FOR DISPLAY

(71) Applicant: Nissan Motor Co., Ltd., Kanagawa (JP)

(72) Inventors: Toshiyuki Mashino, Kanagawa (JP); Yasutomo Sasanuma, Kanagawa (JP); Sho Sakai, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 162 days.

(21) Appl. No.: 17/753,952

(22) PCT Filed: Sep. 19, 2019

(86) PCT No.: PCT/IB2019/001143
§ 371 (c)(1),
(2) Date: Mar. 18, 2022

(87) PCT Pub. No.: WO2021/053366
PCT Pub. Date: Mar. 25, 2021

(65) Prior Publication Data
US 2023/0349714 A1 Nov. 2, 2023

(51) Int. Cl.
*G06F 3/14* (2006.01)
*G01C 21/36* (2006.01)
(Continued)

(52) U.S. Cl.
CPC ..... *G01C 21/3697* (2013.01); *G01C 21/3667* (2013.01); *G09G 5/005* (2013.01);
(Continued)

(58) Field of Classification Search
CPC ............ G01C 21/3697; G01C 21/3667; G09G 5/005; G09G 5/377; G09G 2320/10; G09G 2340/12; G09G 2380/10; H04M 1/724098
See application file for complete search history.

(56) References Cited

U.S. PATENT DOCUMENTS

| | | | |
|---|---|---|---|
| 11,537,354 B2 * | 12/2022 | Watanabe | G06F 3/167 |
| 2012/0050028 A1 | 3/2012 | Mastronardi et al. | |

(Continued)

FOREIGN PATENT DOCUMENTS

| | | | | |
|---|---|---|---|---|
| CN | 104101358 A | | 10/2014 | |
| CN | 106507211 | * | 9/2016 | ......... H04N 21/4312 |

(Continued)

*Primary Examiner* — Hongmin Fan
(74) *Attorney, Agent, or Firm* — Osha Bergman Watanabe & Burton LLP

(57) ABSTRACT

To provide a display control method and apparatus for a display that can display an appropriate amount of information provided by software for communication in accordance with the information currently being displayed on the display, the disclosure includes detecting a phone call or message reception provided by the software for communication (41); when detecting the phone call or message reception, detecting software (2) that is currently displaying information (52) on the display (5); and determining, in accordance with the software that is currently displaying information on the display, a display form of information (P1) provided by the software for communication to be either a first display form of displaying the information in a part of a display region of the software that is currently displaying information on the display or a second display form in which a display area is larger than that of the first display form.

14 Claims, 10 Drawing Sheets

(51) Int. Cl.
*G09G 5/00* (2006.01)
*G09G 5/377* (2006.01)
*H04M 1/72409* (2021.01)

(52) U.S. Cl.
CPC ...... *G09G 5/377* (2013.01); *H04M 1/724098* (2022.02); *G09G 2320/10* (2013.01); *G09G 2340/12* (2013.01); *G09G 2380/10* (2013.01)

(56) References Cited

U.S. PATENT DOCUMENTS

| | | |
|---|---|---|
| 2012/0229505 A1 | 9/2012 | Kuga |
| 2013/0099915 A1* | 4/2013 | Prasad .................... B60R 16/02 340/461 |
| 2014/0295803 A1 | 10/2014 | Kobayashi |
| 2015/0017956 A1 | 1/2015 | Jeong |
| 2015/0206512 A1 | 7/2015 | Kuga |
| 2016/0119897 A1 | 4/2016 | Kim et al. |
| 2017/0085693 A1 | 3/2017 | Kobayashi |
| 2017/0353592 A1 | 12/2017 | Kobayashi |
| 2021/0188301 A1 | 6/2021 | Oba |

FOREIGN PATENT DOCUMENTS

| | | | | |
|---|---|---|---|---|
| CN | 107487274 | * | 3/2017 | ......... B60R 11/0229 |
| CN | 106657595 A | | 5/2017 | |
| CN | 109597200 | * | 7/2018 | ............... G09G 5/14 |
| CN | 108965610 | * | 9/2018 | ........ H04M 1/72484 |
| JP | H11331417 A | | 11/1999 | |
| JP | 2005-286557 A | | 10/2005 | |
| JP | 2007295485 | * | 4/2006 | |
| JP | 2011-237560 A | | 11/2011 | |
| JP | 2011-254299 A | | 12/2011 | |
| KR | 20130126256 | * | 5/2012 | .......... B60R 16/023 |
| WO | 2011065113 A1 | | 6/2011 | |
| WO | 2013046429 A1 | | 4/2013 | |
| WO | 2019082774 A1 | | 5/2019 | |

* cited by examiner

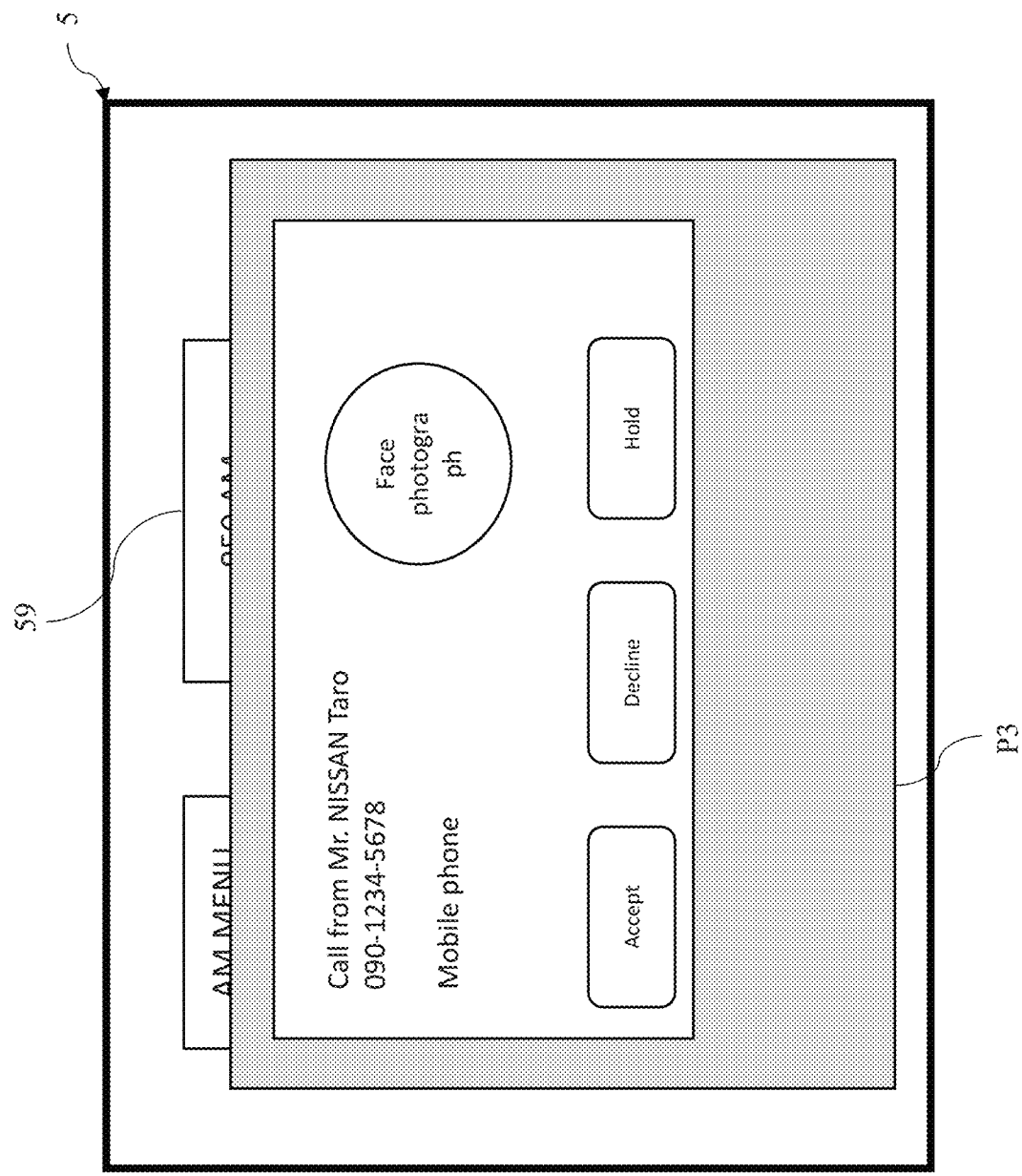

US 11,874,132 B2

DISPLAY CONTROL METHOD AND APPARATUS FOR DISPLAY

TECHNICAL FIELD

The present invention relates to a display control method for a display and a display control apparatus for a display.

Background Art

An onboard navigation device is known, which displays the current position on a map displayed on a display and connects to a telephone set to perform communication control of the telephone set (Patent Document 1). When there is an incoming call on the telephone set, the navigation device outputs a ring tone and displays on a display the fact that there is an incoming call.

PRIOR ART DOCUMENT

Patent Document

[Patent Document 1] JP11-331417A

SUMMARY OF INVENTION

Problems to be Solved by Invention

In the above conventional onboard navigation device, however, regardless of the information currently displayed on the display, the fact that there is an incoming call on the telephone set is displayed in a fixed display form, so there is a problem in that the incoming call information lacks flexibility. For example, the above conventional onboard navigation device displays only the minimum amount of information such as "there is an incoming call to Mr. NISSAN Taro," and therefore the amount of information to be provided to the occupants may be insufficient. Thus, there is a problem in that it is difficult to provide a sufficient amount of information in a window display having a small area as in the above conventional onboard navigation device.

A problem to be solved by the present invention is to provide a display control method and apparatus for a display that can display an appropriate amount of information provided by software for communication in accordance with the information currently being displayed on the display.

Means for Solving Problems

The present invention solves the above problem through, when detecting a phone call or message reception provided by software for communication, determining, in accordance with information that is currently being displayed on a display by specific software, a display form of information provided by the software for communication to be either a first display form of displaying the information in a part of the current display region or a second display form in which the display area is larger than that of the first display form.

Effect of Invention

According to the present invention, it is possible to display a just enough and appropriate amount of information provided by the software for communication in accordance with the information that is currently being displayed on the display by the specific software.

BRIEF DESCRIPTION OF DRAWINGS

FIG. 5A is a diagram illustrating an example of a display screen of the display when there is a phone call in the case in which the radio device is activated.

MODE(S) FOR CARRYING OUT THE INVENTION

Figure 1:
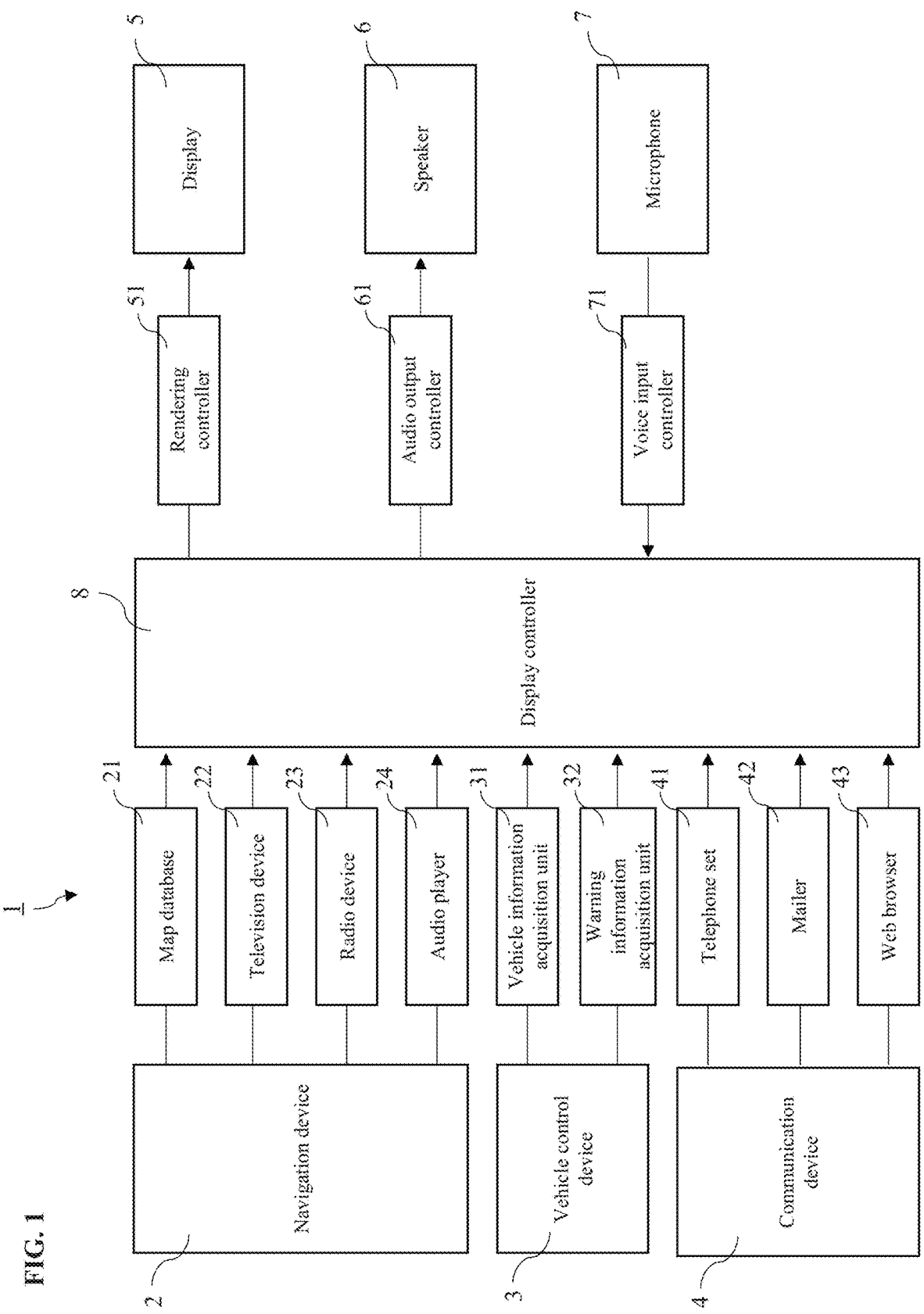
FIG. 1 is a block diagram illustrating a vehicle to which the display control method and apparatus for a display according to the present invention are applied.

Hereinafter, one or more embodiments of the present invention will be described with reference to the drawings. FIG. 1 is a block diagram illustrating a vehicle 1 to which the display control method and apparatus for a display according to the present invention are applied. The vehicle 1 of the present embodiment includes at least a navigation device 2, a vehicle control device 3, a communication device 4, a display 5, a speaker 6, a microphone 7, and a display controller 8.

The navigation device 2 acquires the current position of a subject vehicle from a position detection device composed of a GPS receiver, a gyro sensor, a vehicle speed sensor, etc., accesses map information stored in a map database 21, and displays the current position of the subject vehicle and the map information around the subject vehicle on the display 5 using the display controller 8 and a rendering controller 51. In addition, the navigation device 2 searches for a route to a destination from the destination input by the user, the current position of the subject vehicle obtained by the position detection device, and a preliminarily set search condition and displays route guidance on the display 5 while executing the route guidance by a sound or voice using the speaker 6.

The navigation device 2 is configured to include audio-visual instruments such as a television device 22, a radio device 23, and an audio player 24. The navigation device 2 is provided with an AV instrument selection button (not illustrated), which can be used to select and activate any one of the television device 22, the radio device 23, and the audio player 24. For example, when the television device 22 is selected, the display controller 8 displays the television video information, which is received by a television tuner, on the display 5 using the rendering controller 51 and outputs the television audio information, which is received by the television tuner, from the speaker 6 using an audio output controller 61. In this operation, the display controller 8 also displays various operation menus of the television device 22 on the display 5.

Likewise, when the radio device 23 is selected, the display controller 8 outputs the radio audio information, which is received by a radio tuner, from the speaker 6 using the audio output controller 61. In this operation, the display controller 8 also displays various operation menus of the radio device 23 on the display 5. When the audio player 24 is selected, the display controller 8 reads the audio information recorded on a CD or the like and outputs the audio information from the speaker 6 using the audio output controller 61. In this operation, the display controller 8 also displays various operation menus of the audio player 24 on the display 5.

The vehicle control device 3 controls the drive system such as an internal combustion engine and/or a drive motor, the braking system such as a brake device, and the steering system such as a steering device in accordance with the driver's accelerator pedal input, brake pedal input, and steering wheel input. In addition, the vehicle of this example has a so-called autonomous travel function and can execute constant-speed travel control for traveling while keeping a set constant speed, follow-up travel control for traveling to follow a preceding vehicle up to a set speed, and autonomous steering control including lane change along a route to a destination.

A vehicle information acquisition unit 31 is provided to acquire information on various control items of the drive system, braking system, and steering system executed by the vehicle control device 3. The vehicle information acquired by the vehicle information acquisition unit 31 includes information on the charging/discharging state of a hybrid vehicle, information on the autonomous travel control, the fuel consumption/electricity cost, etc. The display controller 8 uses the rendering controller 51 to display the vehicle state information on the display 5. In addition, a warning information acquisition unit 32 is provided to acquire warning information generated when a predetermined normal range is exceeded in various control items of the drive system, braking system, and steering system executed by the vehicle control device 3. The warning information acquired by the warning information acquisition unit 32 includes a failure of each device, insufficient battery charge, etc., and the display controller 8 displays the warning information on the display 5 using the rendering controller 51.

The communication device 4 can be connected to a telecommunication line network including a telephone line and can make a phone call through the telephone line using a telephone set 41. When making a call using the telephone set 41, the voice of a person on the other end of the line is output from the speaker 6 to the inside of the vehicle via the voice output controller 61, while the user's own voice is collected by the microphone 7, input to the telephone set 41 via a voice input controller 71, and then transmitted to the person on the other end of the line. In addition, a mailer 42 and a web browser 43 are installed in an onboard computer (not illustrated). The mailer 42 can be used to send and receive messages such as e-mails, and the web browser 43 can be used to connect to a social network, send and receive messages, and search for information. Then, the display controller 8 displays various information items on the display when receiving a phone call, being in a call, sending/receiving a message, searching for a website, and the like. This display will be described later.

The display 5 is composed of a touch panel type liquid crystal display or the like and is housed, for example, in a center console box in the vehicle. The display controller 8 inputs a display command to the rendering controller 51, and the display 5 thereby displays information relating to each of various devices that are activated at that time, such as the map information of the navigation device 2, as well as information relating to software of each of various devices such as the television device 22, the radio device 23, the audio player 24, the vehicle information acquisition unit 31 and the warning information acquisition unit 32 which acquire information from the vehicle control device 3, the telephone set 41, the mailer 42, and the web browser 43.

Figure 3A:
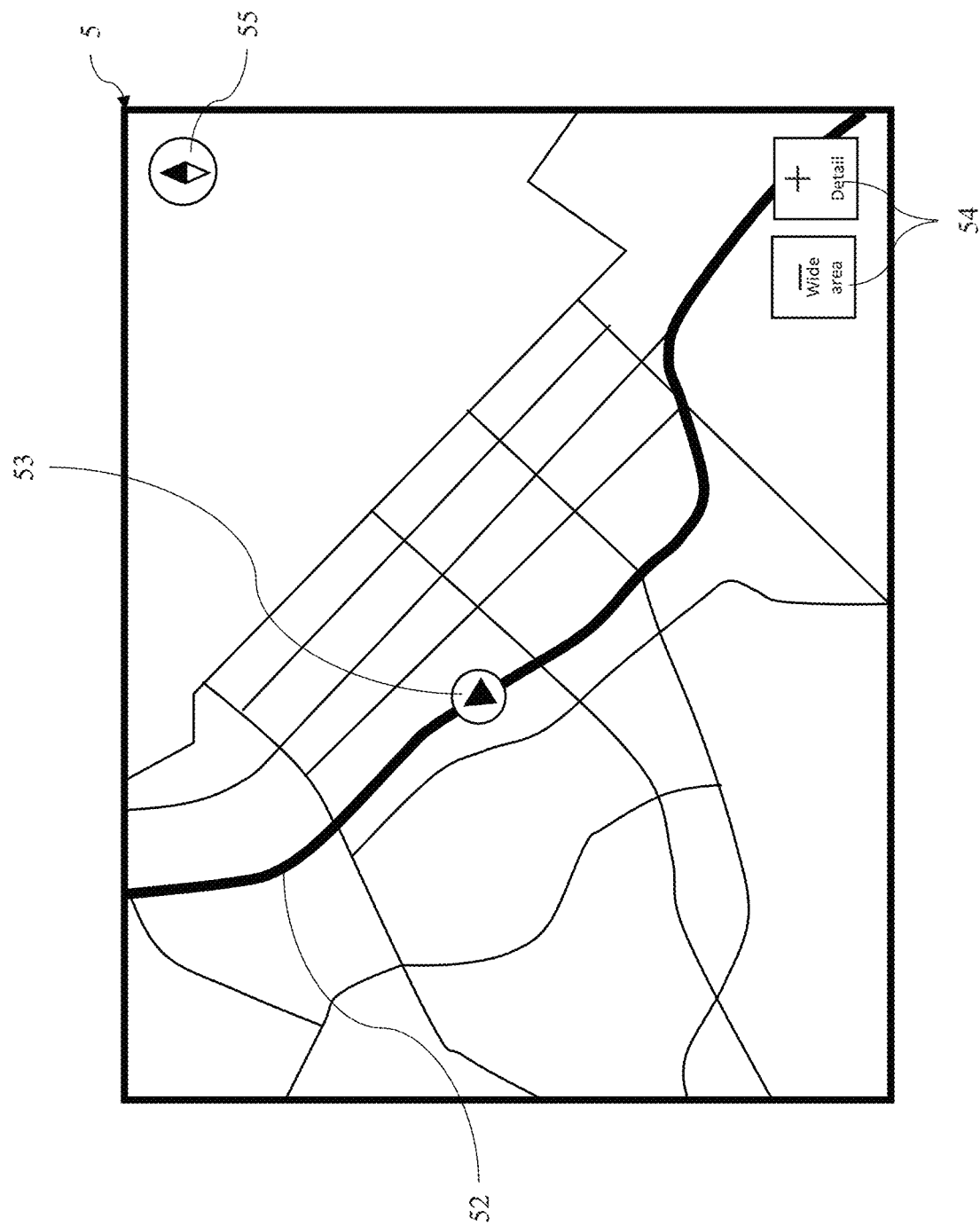
FIG. 3A is a diagram illustrating an example of a display screen of the display when a navigation device is activated.

FIG. 3A is a diagram illustrating an example of a display screen of the display 5 in a state in which the navigation device 2 is activated to perform the route guidance to an input destination. As illustrated in the figure, the display 5 displays map information 52 around the current position of the subject vehicle read from the map database 21, a mark 53 indicating the current position of the subject vehicle, buttons 54 for enlarging or reducing the displayed map information, and a compass 55. The route to a destination is displayed in a specific color on the road in the map information (indicated by a thick line in the figure). As the subject vehicle moves, the map information 52 is displayed so as to also gradually move so that the current position of the subject vehicle is located, for example, at the center of the display 5. The driver determines the course ahead while looking at the map information which is displayed on the display 5 and includes the mark 53 indicating the current position of the subject vehicle and the route to the destination. Thus, the map information and the route guidance information displayed by the navigation device 2 are important information items for selecting the course of the subject vehicle.

Figure 3B:
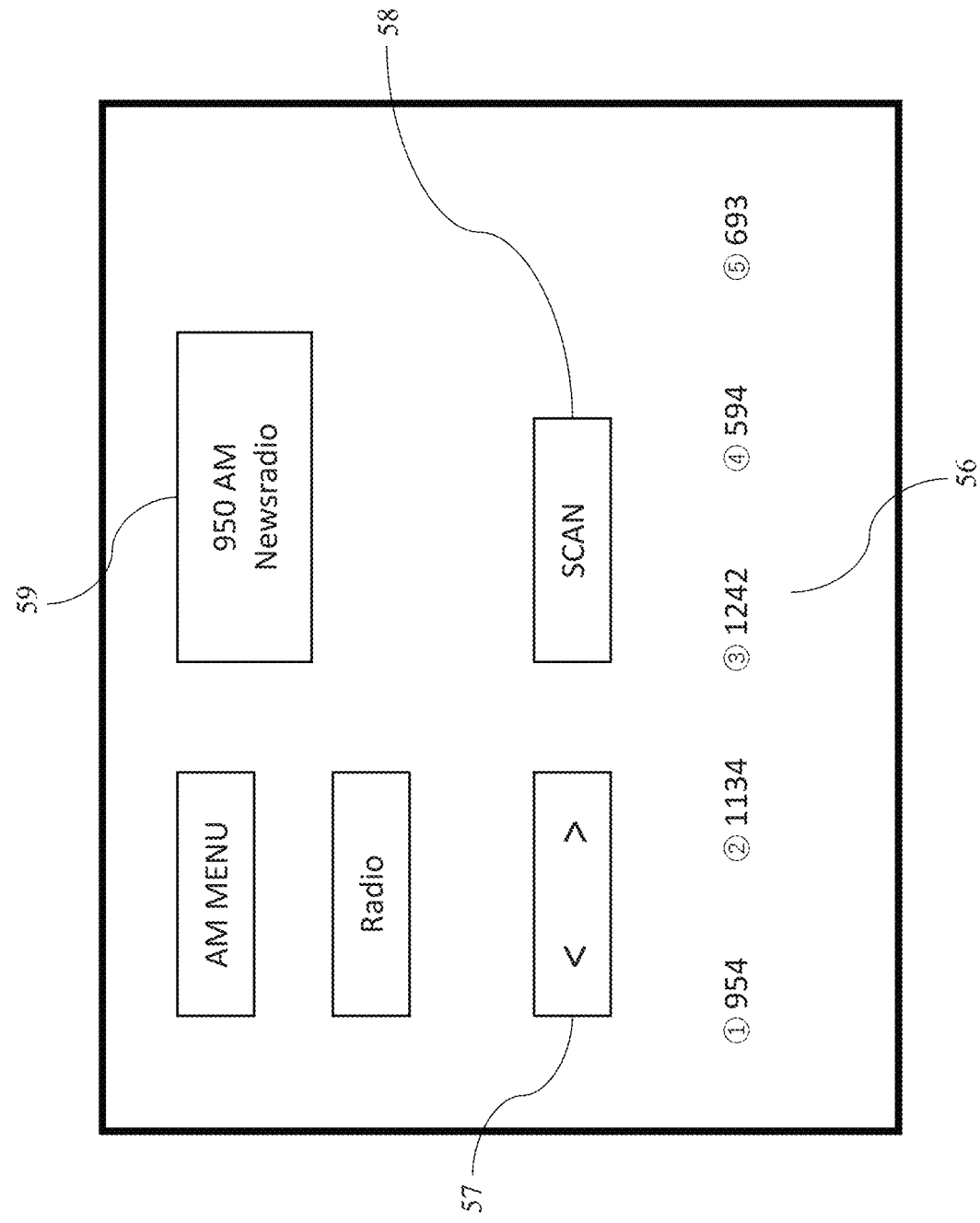
FIG. 3B is a diagram illustrating an example of a display screen of the display when a radio device is activated.

FIG. 3B is a diagram illustrating an example of a display screen of the display 5 in a state in which the radio device 23 is activated and a specific program is selected from AM broadcasts. As illustrated in the figure, the display 5 displays channel selection buttons 56 in which, for example, the frequencies of five broadcasting stations are preliminarily set, a frequency increase/decrease switch 57 that allows an arbitrary frequency to be selected, a scan button 58 for scanning the frequency to be selected in the ascending or descending direction to detect a broadcasting station having a strong reception sensitivity, and the frequency and program name 59 of the currently selected broadcasting station. The radio device 23 and the audio player 24 are devices that output only audio information without video, and therefore the information displayed on the display 5 by the radio device 23 or the audio player 24 is information that is needed only for a specific operation such as a broadcasting station selection operation, but once it is tuned in, there is no need for the information anymore.

Other than the display of the map information of the navigation device 2 illustrated in FIG. 3A and the display of the radio device 23 illustrated in FIG. 3B, when the television device 22 is activated, a broadcasting station to be selected is displayed as an initial activation screen, and then the video information from the selected broadcasting station is displayed on the display 5. Additionally or alternatively, when the vehicle information acquisition unit 31 is activated, information on the charging/discharging state of a hybrid vehicle, information on the autonomous travel control, and the like are displayed on the display 5 in accordance with the user's selection. Additionally or alternatively, when the software of the telephone set 41 is activated, a numerical keypad for making a call and a preliminarily stored telephone directory list as well as a talk time during a call, etc. are displayed on the display 5. Additionally or alternatively, when the mailer 42 or the web browser 43 is activated, the menu screen of the mailer 42 or the web browser 43 is displayed on the display 5.

In a case in which software of one device is activated, when software of another device is activated, the display 5 of the present embodiment displays information provided by the software of the other device on the display 5 in a small or large size. Here, examples of the case in which the software of one device is activated include a case in which the map information of the navigation device 2 is activated and a case in which software of any one of various devices is activated, such as the television device 22, the radio device 23, the audio player 24, and the vehicle information acquisition unit 31 which acquires information from the vehicle control device 3. Examples of the software of another device include software for communication having at least one function of a talk or message reception, for example, software of any one of devices such as the warning information acquisition unit 32 which acquires information from the vehicle control device 3, the telephone set 41, the mailer 42, and the web browser 43. The display controller 8 of the present embodiment determines, in accordance with the software that is currently displaying information on the display 5, the display form of information provided by the software for communication to be either a first display form of displaying the information in a part of the display region of the software that is currently displaying information on the display 5 or a second display form in which the display area is larger than that of the first display form.

Figure 4A:
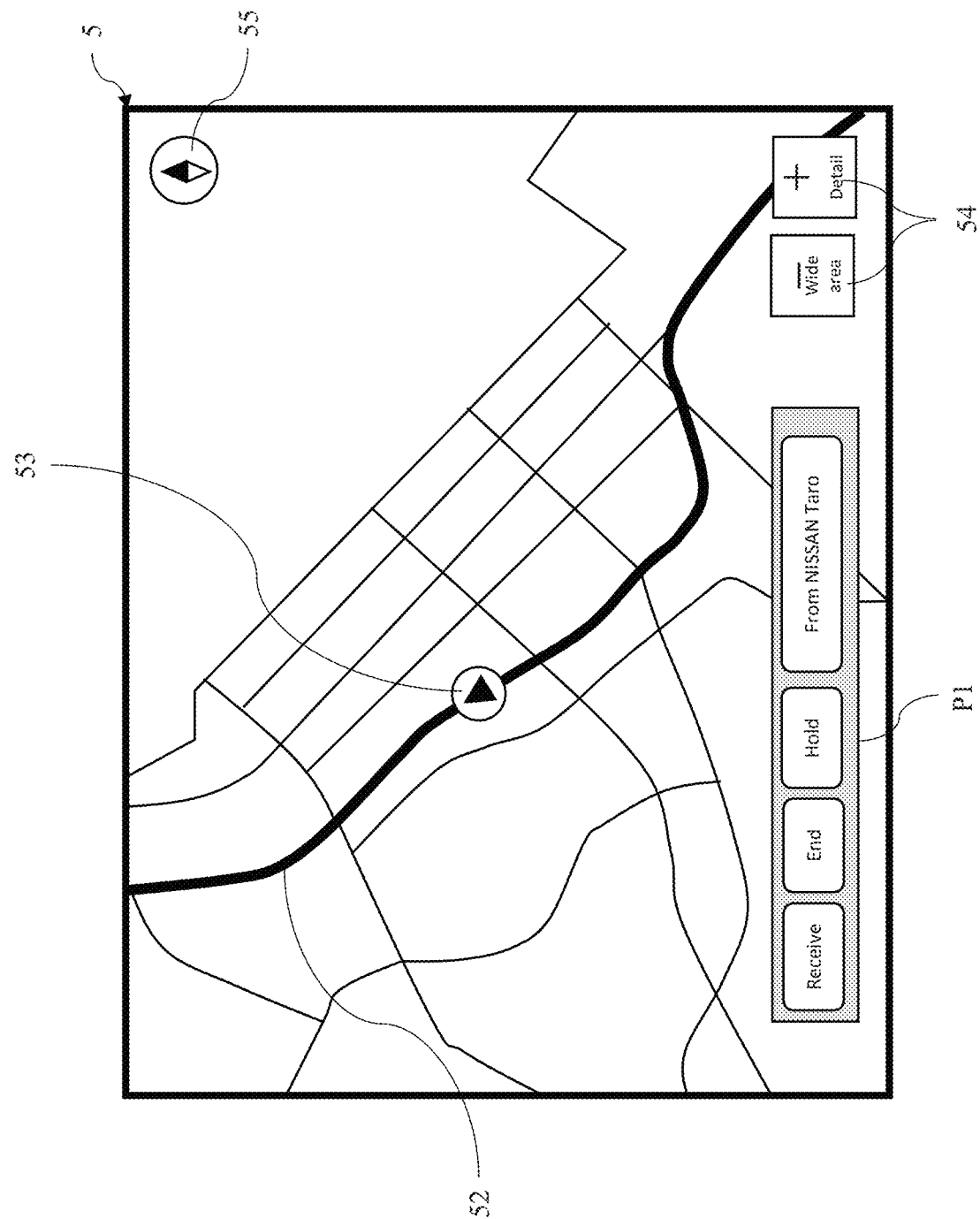
FIG. 4A is a diagram illustrating an example of a display screen of the display when there is a phone call in the case in which the navigation device is activated.
Figure 4B:
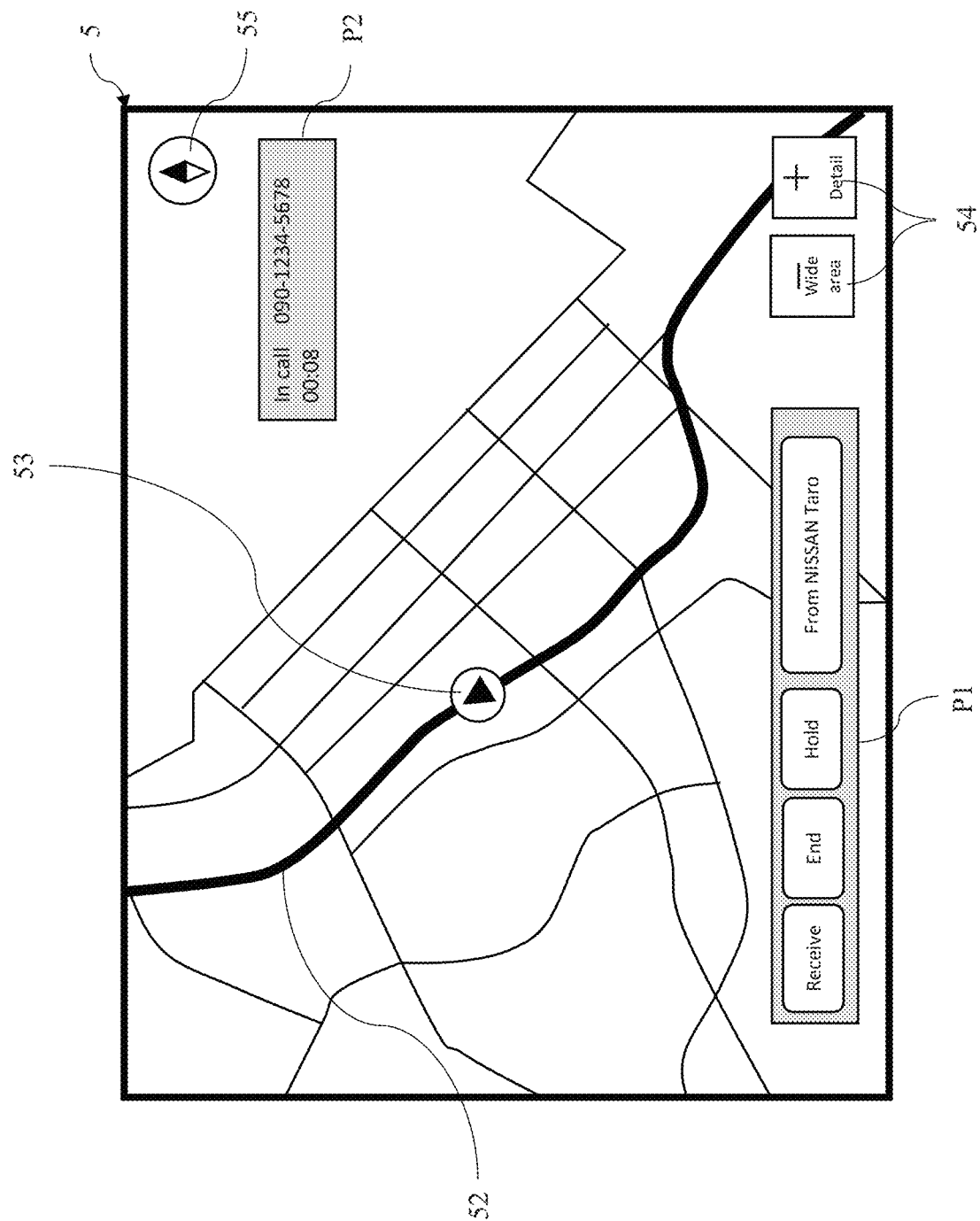
FIG. 4B is a diagram illustrating an example of a display screen of the display when there is a phone call and a talk is continued in the case in which the navigation device is activated.

For example, when the software of the navigation device 2 is activated and the map information and the route to the destination are displayed on the display 5, if the telephone set 41 receives a call, the speaker 6 outputs a ringing tone and the display 5 displays information relating to the call. FIG. 4A is a diagram illustrating an example of a display screen of the display 5 when there is a phone call in the case in which the navigation device 2 is activated, and FIG. 4B is a diagram illustrating an example of a display screen of the display when there is a phone call and a talk is continued in the case in which the navigation device 2 is activated. The display controller 8 of the present embodiment detects an incoming call on the telephone set 41 and also detects what software is currently displaying information on the display 5. Then, when detecting that the software currently displaying the information on the display 5 provides the map information of the navigation device 2 and the route guidance to the destination, as illustrated in FIG. 4A, the display controller 8 determines the display form of incoming call information P1 of the telephone set 41 to be the first display form (a form of displaying the information in a part of the display region of the software currently displaying information on the display 5) and displays the incoming call information P1. The incoming call information P1 of the telephone set 41, that is, the information provided by the software for communication, is displayed as a sub screen on a layer above the display screen displayed by the software currently displaying information on the display 5 composed of a liquid crystal display.

Figure 5B:
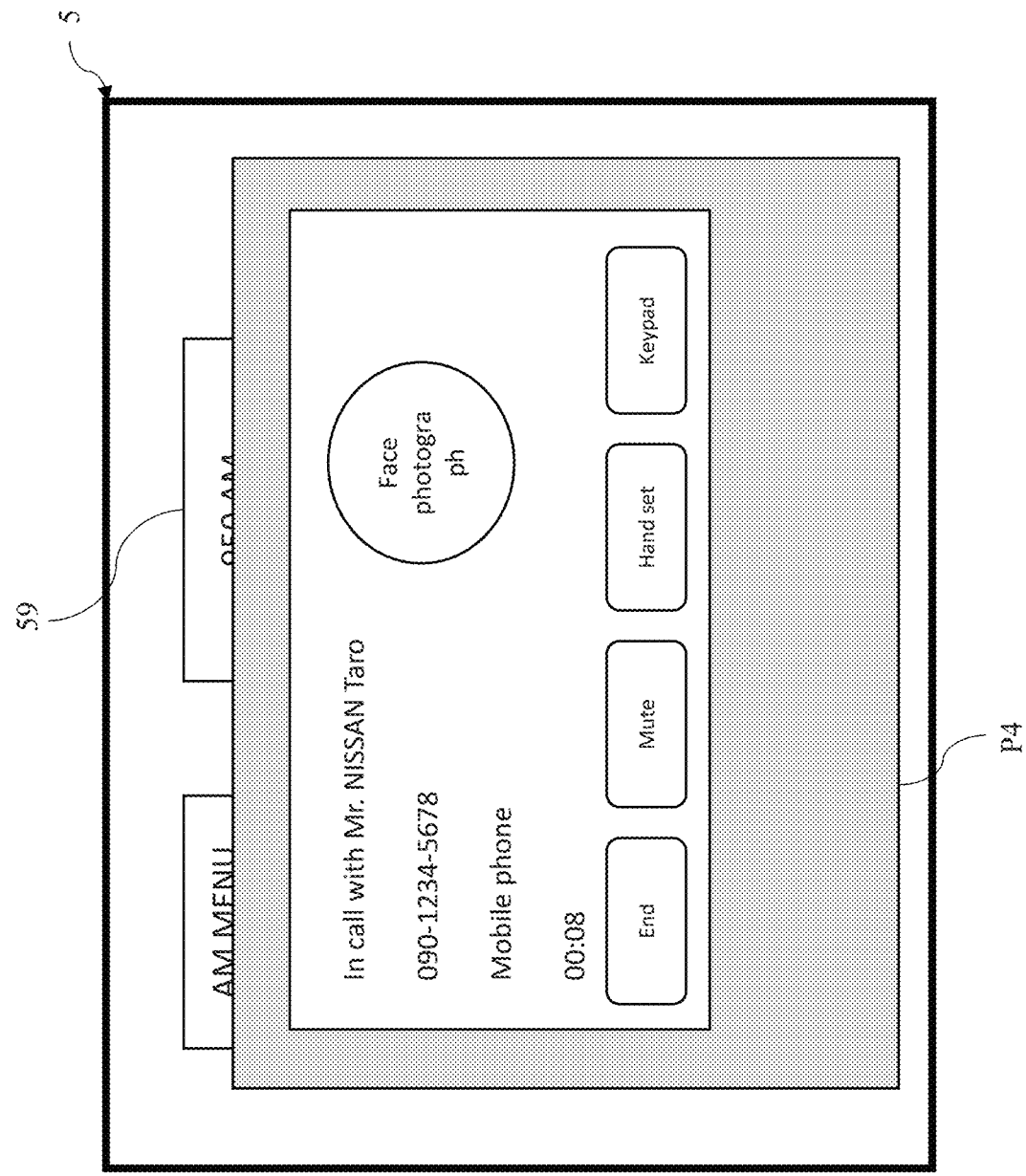
FIG. 5B is a diagram illustrating an example of a display screen of the display when there is a phone call and a talk is continued in the case in which the radio device is activated.

On the other hand, when the radio device 23 is activated and the control information of the radio device 23 is displayed on the display 5 as illustrated in FIG. 3B, for example, if the telephone set 41 receives a call, the speaker 6 outputs a ringing tone and the display 5 displays information relating to the call. FIG. 5A is a diagram illustrating an example of a display screen of the display 5 when there is a phone call in the case in which the radio device 23 is activated, and FIG. 5B is a diagram illustrating an example of a display screen of the display 5 when there is a phone call and a talk is continued in the case in which the radio device 23 is activated. The display controller 8 of the present embodiment detects an incoming call on the telephone set 41 and also detects what software is currently displaying information on the display 5. Then, when detecting that the software currently displaying the information on the display 5 is the software of the radio device 23, as illustrated in FIG. 5A, the display controller 8 determines the display form of incoming call information P3 of the telephone set 41 to be the second display form (a form in which the display area is larger than that of the first display form of the incoming call information P1 illustrated in FIG. 4A) and displays the incoming call information P3. The incoming call information P3 of the telephone set 41, that is, the information provided by the software for communication, is displayed as a sub screen on a layer above the display screen displayed by the software currently displaying information on the display 5 composed of a liquid crystal display.

Figure 6A:
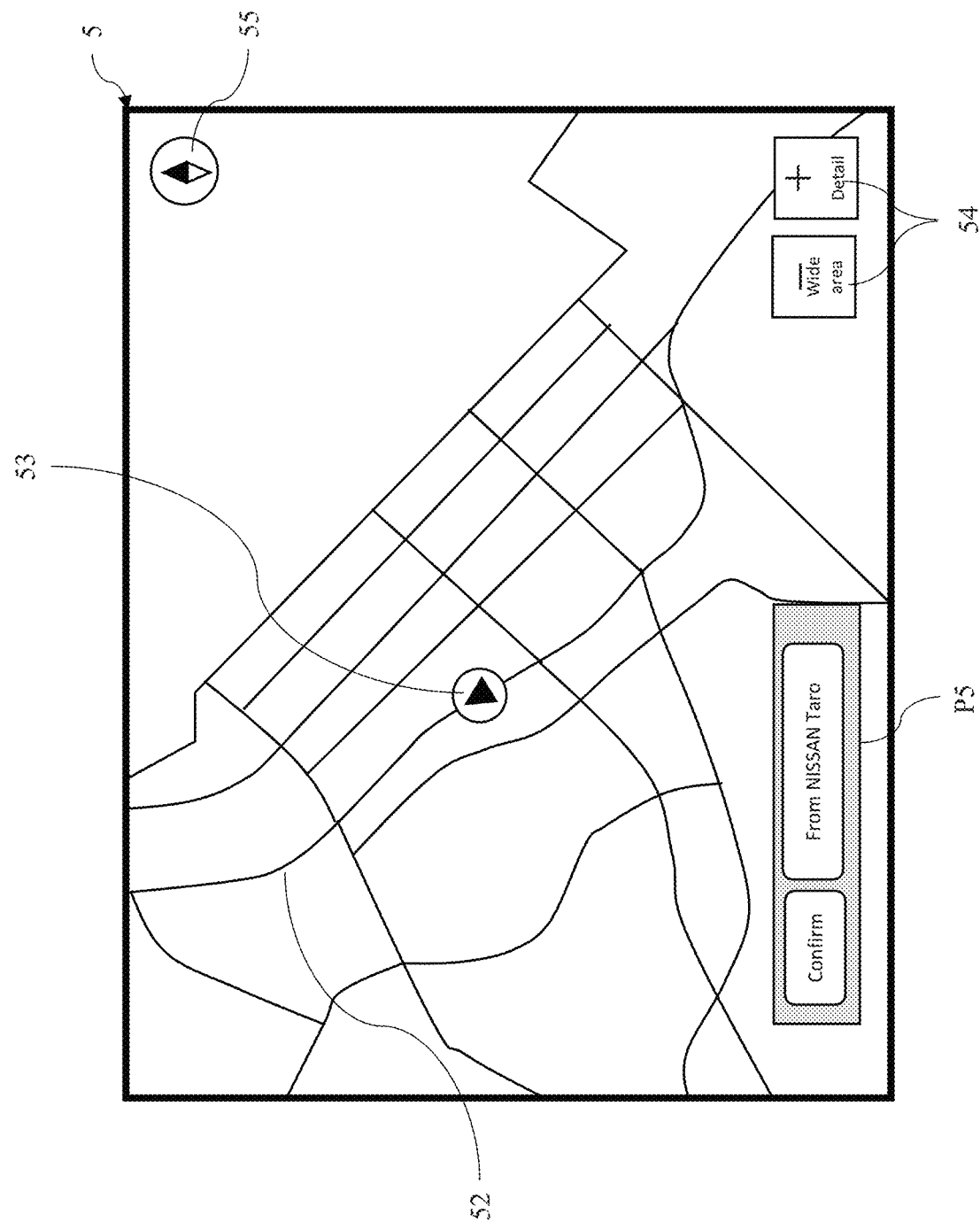
FIG. 6A is a diagram illustrating an example of a display screen of the display when an e-mail is received in the case in which the navigation device is activated.
Figure 6B:
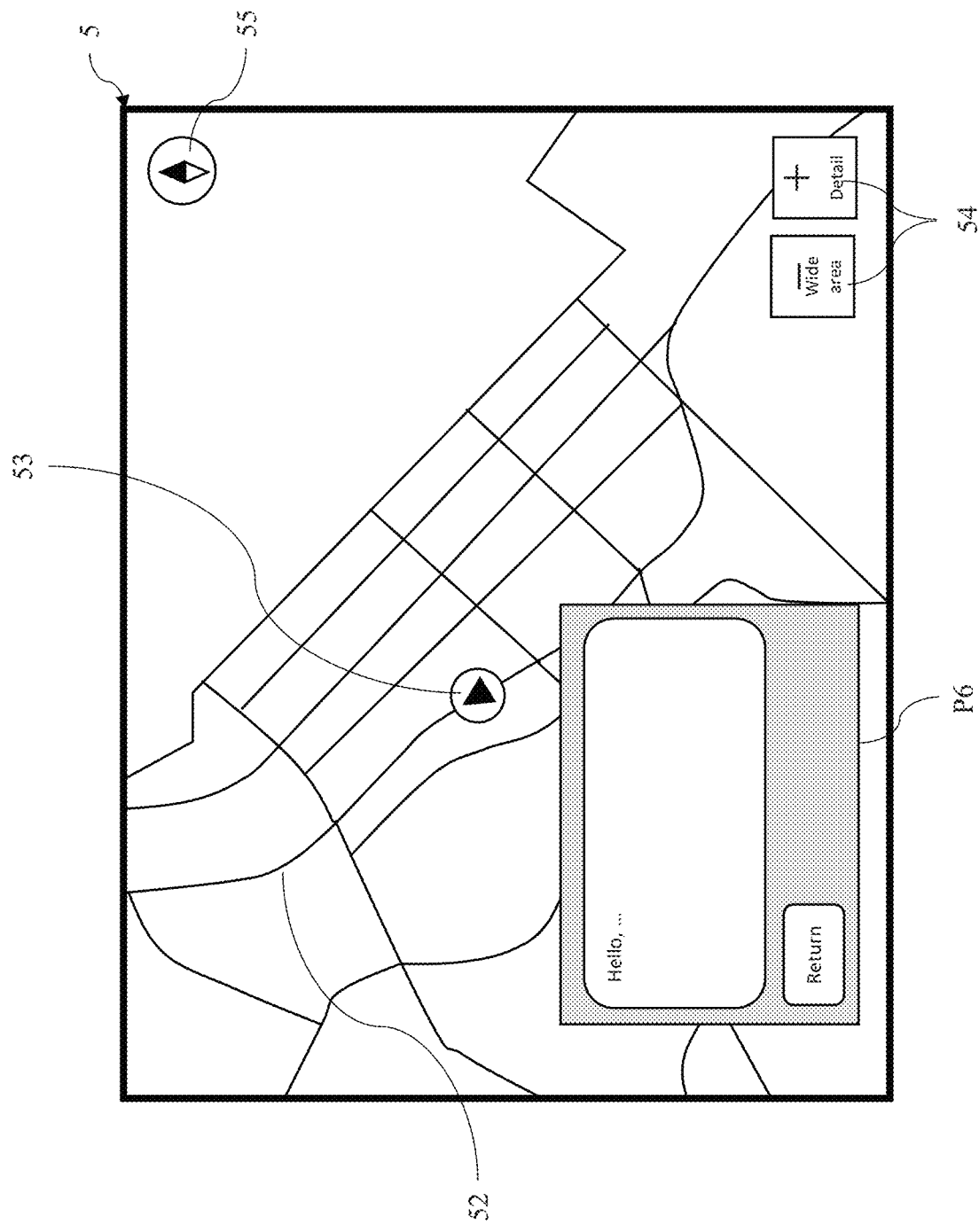
FIG. 6B is a diagram illustrating an example of a display screen of the display when a confirmation button is pressed from the state illustrated in FIG. 6A to display the content of the e-mail.

Additionally or alternatively, when the software of the navigation device 2 is activated and the map information is displayed on the display 5, for example, if an e-mail is received, the speaker 6 outputs an e-mail reception sound and the display 5 displays information relating to the e-mail reception. FIG. 6A is a diagram illustrating an example of a display screen of the display 5 when an e-mail is received in the case in which the navigation device 2 is activated, and FIG. 6B is a diagram illustrating an example of a display screen of the display 5 when a confirmation button is pressed from the state illustrated in FIG. 6A to display the content of the e-mail. The display controller 8 of the present embodiment detects the reception of the e-mail by the mailer 42 and also detects what software is currently displaying information on the display 5. Then, when detecting that the software currently displaying the information on the display 5 is the software of the navigation device 2, as illustrated in FIG. 6A, the display controller 8 determines the display form of reception information P5 of the mailer 42 to be the first display form (a form of displaying the information in a part of the display region of the software currently displaying information on the display 5) and displays the reception information P5. The reception information P5 of the mailer 42, that is, the information provided by the software for communication, is displayed as a sub screen on a layer above the display screen displayed by the software currently displaying information on the display 5 composed of a liquid crystal display.

The display controller 8 of the present embodiment determines the display form on the display 5 of the software for communication, that is, the software of each of the warning information acquisition unit 32, the telephone set 41, the mailer 42, and the web browser 43 to be either the first display form or the second display form in accordance with the software currently displaying information on the display 5, that is, the software of each of the navigation device 2, the television device 22, the radio device 23, the audio player 24, and the vehicle information acquisition unit 31. In this case, the display form of the software for communication may be determined in accordance with the type of software currently displaying information on the display 5 or may also be determined in accordance with whether or not the software currently displaying information on the display 5 is executing a specific function. Alternatively, a user such as a driver may determine (customize) the display form of the software for communication in accordance with the type of software currently displaying information on the display 5.

When determining the display form of the software for communication in accordance with the type of software currently displaying information on the display 5, the display controller 8 determines whether or not the software currently displaying information on the display 5 is software in which display of the information is prioritized as compared with the software for communication. Then, when determining that the software currently displaying information on the display 5 is the software in which display of the information is prioritized, the display controller 8 determines the display form of information provided by the software for communication to be the first display form, while when determining that the software currently displaying information on the display 5 is not the software in which display of the information is prioritized, the display controller 8 determines the display form of information provided by the software for communication to be the second display form.

Whether or not the software currently displaying information on the display 5 is software in which display of the information is prioritized as compared with the software for communication may be stored by preliminarily determining the priority among a plurality of software components. For example, the information for displaying the map and the route to the destination provided by the software of the navigation device 2 should be prioritized, in particular when driving, as compared with the incoming call information P1 and P3 of the telephone set 41 and the reception information P5 of the mailer 42. As an example, whether or not the information should be prioritized can be made based on the importance for the driver. Therefore, as illustrated in FIG. 4A, when the software of the navigation device 2 is activated and the map information and the route to the destination are displayed on the display 5, if the telephone set 41 receives a call, the incoming call information P1 is displayed on the display 5 in the first display form. In this operation, it is preferred to control the display position of the incoming call information P1 to a position that does not interfere with the mark 53 indicating the current position of the subject vehicle or the route to the destination (the road indicated by the thick line in the figure). This allows the driver to know the incoming call on the telephone set 41 without being disrupted when obtaining the map information around the current position and the destination.

In the information provided by the software for communication, however, the warning information such as equipment failure or fuel shortage provided by the warning information acquisition unit 32 should be prioritized even during the driving as compared with the information for displaying the map and the route to the destination provided by the software of the navigation device 2. Therefore, when the software of the navigation device 2 is activated and the map information and the route to the destination are displayed on the display 5, if any vehicle warning information is received by the warning information acquisition unit 32, the warning information is displayed on the display 5 in the second display form.

On the other hand, the information displayed on the display 5 when the software of the radio device 23 is activated, for example, cannot be said to be prioritized as compared with the incoming call information P1 or P3 of the telephone set 41 or the reception information P5 of the mailer 42. This is because the information displayed on the display 5 when the software of the radio device 23 is activated is information that is needed only for a specific operation such as a broadcasting station selection operation, but once it is tuned in, there is no need for the information anymore. Therefore, as illustrated in FIG. 5A, when the software of the radio device 23 is activated and the control information of the radio device 23 is displayed on the display 5, if the telephone set 41 receives a call, the incoming call information P3 is displayed on the display 5 in the second display form.

Moreover, even when the map information of the navigation device 2 and the route to the destination are displayed on the display 5, the driver does not need to manually drive while gazing at the map information and the route to the destination displayed on the display during the execution of the autonomous travel control function including the lane change along the route to the destination. Thus, when the driving load on the driver is smaller than that of the manual operation, if the telephone set 41 receives a call, the incoming call information P3 may be displayed on the display 5 in the second display form as illustrated in FIG. 5A.

When determining the display form of the software for communication in accordance with whether or not the software currently displaying information on the display 5 is executing a specific function, the display controller 8 determines whether or not the software currently displaying information on the display 5 is executing the specific function. When determining that the software currently displaying information on the display 5 is executing the specific function, the display controller 8 determines the display form of information provided by the software for communication to be the first display form, while when determining that the software currently displaying information on the display 5 is not executing the specific function, the display controller 8 determines the display form of information provided by the software for communication to be the second display form.

For example, the navigation device 2 has a function of performing route guidance to the destination in addition to a function of displaying the map information and the current position of the subject vehicle, and it is assumed that the function of performing route guidance to the destination is the specific function as referred to herein. Then, when a determination is made that the software currently displaying the information on the display 5 is executing the function of performing route guidance to the destination, the display form of the information provided by the software for communication is determined to be the first display form, while when a determination is made that the software currently displaying the information on the display 5 is not executing the function of performing route guidance to the destination, the display form of the information provided by the software for communication is determined to be the second display form.

The information displayed by the software for communication and superimposed on the information currently displayed on the display 5 is not particularly limited, but in the case of the incoming call information of the telephone set 41, this information includes information indicating that the telephone set 41 receives an incoming call, specifically, input it buttons of "receive," "end," and "hold" and the name of the person on the other end of the line, "NISSAN Taro," as illustrated in FIG. 4A. Additionally or alternatively, as illustrated in the upper right of FIG. 4B, the information displayed by the software for communication includes information indicating that the call is in progress, specifically, "in a call," the telephone number of the person on the other end of the line, "090-1234-5678," and the talk time "00:08."

Additionally or alternatively, in the information displayed in the second display form by the software for communication and superimposed on the information currently displayed on the display 5, a great number of optional operations of the software for communication or a great deal of attribute information of the person on the other end of the line is preferably set as compared with the case of displaying in the first display form. For example, regarding the incoming call information of the telephone set 41 as the information provided by the software for communication, when displayed in the first display form, the incoming call information P1 is displayed, which includes the input buttons of "receive," "end," and "hold" and the name of the person on the other end of the line, "NISSAN Taro," as illustrated in FIG. 4A. On the other hand, when displayed in the second display form, as illustrated in FIG. 5A, for example, incoming call information P3 is displayed, which includes not only the name of the person on the other end of the line (incoming call information P1 illustrated in FIG. 4A) but also the attribute information such as a telephone number, a face photograph, and the type of telephone as well as optional operations such as an "accept" button and a "decline" button to the call. Additionally or alternatively, during the call illustrated in FIG. 5B, in-call information P4 is displayed, which includes not only the phone number of the person on the other end of the line (in-call information P2 illustrated in FIG. 4B) but also the attribute information such as a name, a face photograph, and the type of telephone as well as optional operations such as a "handset" button and a "keypad" button. The "handset" button is for having a talk using a handset.

Additionally or alternatively, when the information provided by the software for communication is displayed in the second display form so as to be superimposed on the information currently displayed on the display 5, the information is preferably displayed in a state in which the operation of the software currently displaying information on the display 5 is not possible. For example, as illustrated in FIG. 5A, when the incoming call information P3 of the telephone set 41 is displayed in the second display form so as to be superimposed on the control screen of the radio device 23 which is displayed behind the incoming call information P3, input information from the input buttons is not accepted. The input buttons include the channel selection buttons 56 in which the frequencies of five broadcasting stations are indicated, the frequency increase/decrease switch 57 which allows an arbitrary frequency to be selected, and the scan button 58 for scanning the frequency to be selected in the ascending or descending direction to detect a broadcasting station having a strong reception sensitivity.

Figure 2:
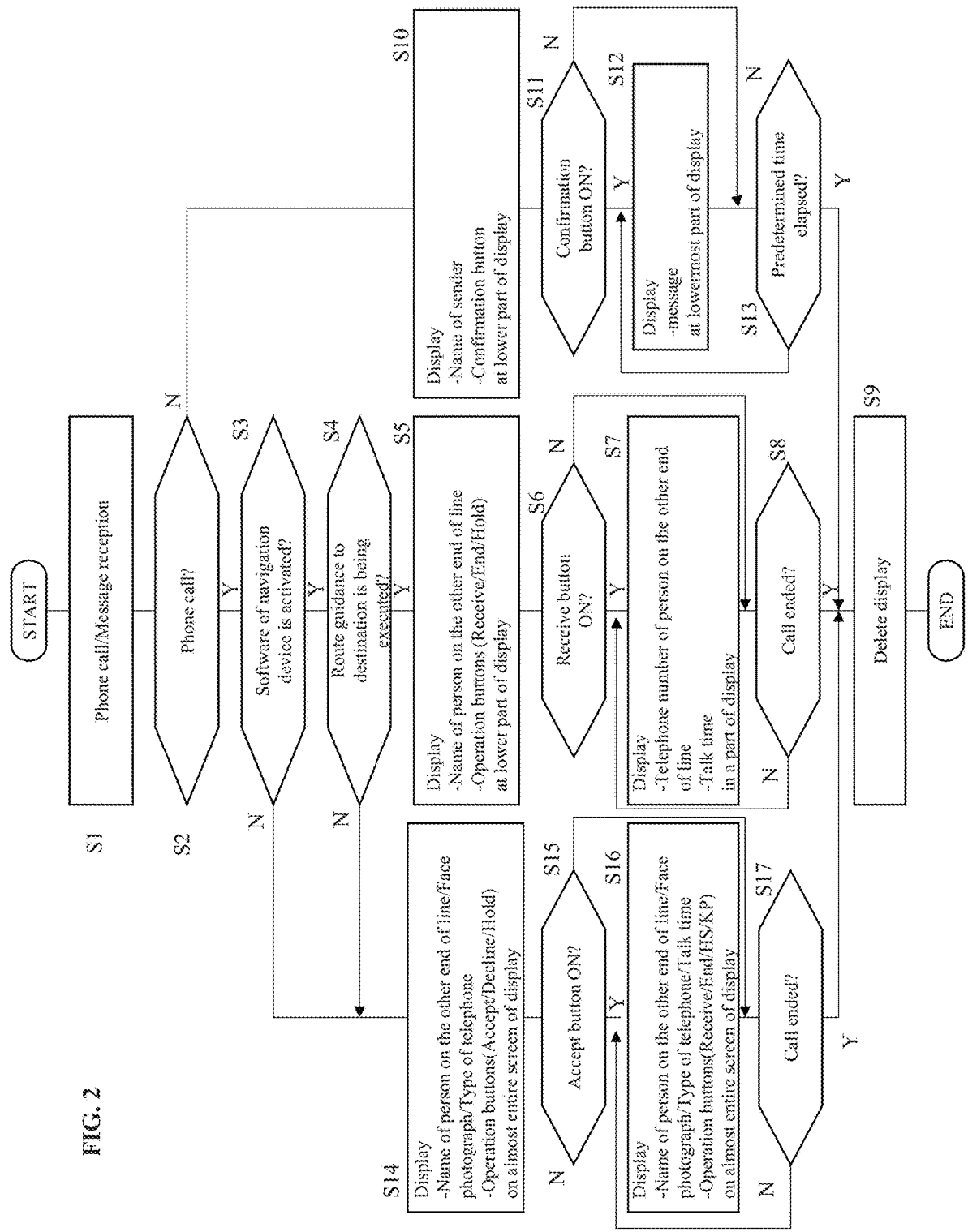
FIG. 2 is a flowchart illustrating the display control method for a display executed by a display controller of FIG. 1.

The information processing in the display controller 8 of the present embodiment will then be described. FIG. 2 is a flowchart illustrating a display control method executed by the display controller 8 of FIG. 1. First, in step S1, when the display controller 8 detects an incoming call on the telephone set 41 or message reception on the mailer 42 or web browser 43 (reception function of an SNS or the like), the process proceeds to step S2, in which the display controller 8 determines whether or not the detected one in step S1 is a phone call. Then, when the detected one is a phone call, the process proceeds to step S3, while when the detected one is message reception on the mailer 42 or the web browser 43 rather than a phone call, the process proceeds to step S10. The processing content of steps S10 to S13 will be described later.

In step S3, a determination is made as to whether or not the software currently displaying information on the display 5 is the software of the navigation device 2, and when it is the software of the navigation device 2, the process proceeds to step S4, while when it is software other than that of the navigation device 2, the process proceeds to step S14. In step S4, a determination is made as to whether or not the route guidance to the destination is being executed in the software of the navigation device 2, and when the route guidance to the destination is being executed, the process proceeds to step S5, while when the route guidance is not being executed, the process proceed to S14. The processing content of steps S14 to S17 will be described later.

In step S5, the map information and the route guidance information are displayed on the current display 5 by the software of the navigation device 2, and therefore, in order to give priority to this display, as illustrated in FIG. 4A, the incoming call information P1 indicating that there is a phone call is displayed at the lower part of the screen in the first display form with a small area. This allows the user such as the driver to know that there is an incoming call from "NISSAN Taro." When responding to this incoming call, the user turns on the receive button of the incoming call information P1 (or turns on a receive button provided on the steering wheel or the like (not illustrated)), and when declining, the user leaves it with doing nothing. In step S6, when a determination is made that the receive button is turned on to respond to the incoming call, the process proceeds to step S7, while when a determination is made that the incoming call is left to decline it, the process proceeds to step S8.

In step S7, as illustrated in FIG. 4B, the in-call information P2 is displayed in the first display form with a small area while displaying the incoming call information P1 at the lower part of the display 5. The in-call information P2 includes display indicating that the call is in progress, the phone number of the person on the other end of the line, and the talk time. The in-call information P2 is displayed in an upper right portion of the display 5 that does not hide the map information. Here, when the user such as the driver turns on a given button, the displayed information may be changed to the in-call information P4 in the second display form as illustrated in FIG. 5B.

In step S8, a determination is made as to whether or not the user turns on the end button of the incoming call information P1, and when the end button is turned on, the process proceeds to step S9, while when the end button is not turned on, the process of step S7 is continued. In step S9, the display by the software for communication (the telephone set 41 or the mailer 42 or web browser 43) which has been displayed up to that time is deleted, and the display control process is terminated.

Referring again to step S3, when the software currently displaying information on the display 5 is software other than that of the navigation device 2, for example, when it is the software of the radio device 23, the process proceeds to step S14. In addition, when a determination is made in step S3 that the software currently displaying information on the display 5 is the software of the navigation device 2, but another determination is made in step S4 that the function of route guidance to the destination is not being executed, the process also proceeds to step S14.

In step S14, the current display 5 displays only the information provided by software other than that of the navigation device 2 or the map information without execution of the route guidance even if it is displayed by the software of the navigation device 2. Therefore, in order to prioritize the display of information provided by the software for communication, as illustrated in FIG. 5A, the incoming call information P3 indicating that there is a phone call is displayed on almost the entire screen in the second display form with a large area. The displayed incoming call information P3 includes not only the name of the person on the other end of the line as in the incoming call information P1 illustrated in FIG. 4A but also the attribute information such as a telephone number, a face photograph, and the type of telephone as well as optional operations such as an "accept" button and a "decline" button to the call. This allows the user such as the driver to know the attribute information such as a telephone number, a face photograph, and the type of telephone in addition to the fact that there is an incoming call from "NISSAN Taro." Moreover, the decline button for the incoming call is added to the input buttons of "receive," "end," and "hold" illustrated in FIG. 4A, and therefore the degree of freedom in responding to the person on the other end of the line can be increased, such as by automatically sending a decline message "I can't answer because I'm driving now, so please call again."

The user such as the driver turns on the accept button of the incoming call information P3 illustrated in FIG. 5A (or turns on an accept button provided on the steering wheel or the like (not illustrated)) when responding to the phone call or otherwise turns on the decline button when declining. In step S15, when a determination is made that the accept button is turned on to respond to the incoming call, the process proceeds to step S16, while when a determination is made that the decline button is turned on to decline, the process proceeds to step S17.

In step S16, as illustrated in FIG. 5B, the in-call information P4 is displayed on almost the entire screen of the display 5 in the second display form with a large area as substitute for the incoming call information P3 up to that time. The in-call information P4 includes display indicating that the call is in progress, the telephone number of the person on the other end of the line, the type of telephone, a face photograph, an end button, a mute button, a handset button, and a keypad button.

In step S17, a determination is made as to whether or not the user turns on the end button of the in-call information P4, and when a determination is made that the end button is turned on, the process proceeds to step S9, while when a determination is made that the end button is not turned on, the process of step S16 is continued. In step S9, the display by the software for communication (the telephone set 41 or the mailer 42 or web browser 43) which has been displayed up to that time is deleted, and the display control process is terminated.

Referring again to step S2, when the process of step S1 is message reception by the mailer 42 or the web browser 43, the process proceeds to step S10, in which, as illustrated in FIG. 6A, reception information P5 indicating that there is message reception is displayed at the lower part of the screen in the first display form with a small area. This allows the user such as the driver to know that a message from "NISSAN Taro" is received by the mailer 42 or the web browser 43. The reception of a message by the mailer 42 or the web browser 43 is less urgent in the sense that it is less necessary to respond immediately as compared with a phone call. Therefore, the reception information P5 is provided with a confirmation button, and when the confirmation button is turned on, as illustrated in FIG. 6B, the content of the message is displayed in the second display form with an area larger than the area of the reception information P5 displayed in the first display form, while when the confirmation button is not turned on, the display of the reception information P5 illustrated in FIG. 6A is deleted after a predetermined time has elapsed.

That is, in step S11 of FIG. 2, a determination is made as to whether or not the user turns on the confirmation button of the reception information P5, and when the confirmation button is turned on, the process proceeds to step S12, while when the confirmation button is not turned on, the process proceeds to step S13. In step S12, as illustrated in FIG. 6B, the content of the received message is displayed in the second display form with a large area. In step S13, a determination is made as to whether or not a predetermined time has elapsed, and when the predetermined time has elapsed, the process proceeds to step S9, in which the content of the reception information P5 of FIG. 6A or the content of a message P6 of FIG. 6B is deleted, and the display control process is terminated.

As described above, according to the vehicle 1 to which the display control method and apparatus for a display of the present embodiment are applied, the display form of information provided by the software for communication is determined, in accordance with the software currently displaying information on the display 5, to be either the first display form of displaying the information in a part of the display region of the software currently displaying information on the display or the second display form in which the display area is larger than that of the first display form. Through this operation, it is possible to display an appropriate amount of information provided by the software for communication in accordance with the information that is currently being displayed on the display 5 by specific software.

Moreover, according to the vehicle 1 to which the display control method and apparatus for a display of the present embodiment are applied, when a determination is made that the software currently displaying information on the display 5 is software in which display of the information is prioritized, the display form of information provided by the software for communication is determined to be the first display form, while when a determination is made that the software currently displaying information on the display is not software in which display of the information is prioritized, the display form of information provided by the software for communication is determined to be the second display form. Through this operation, in the case of software in which display of the information is prioritized, the display form which does not hide the display is obtained, while in the case of software in which display of the information is not prioritized, the information provided by the software for communication can be displayed in a display form that allows a sufficient amount of information to be ensured.

Furthermore, according to the vehicle 1 to which the display control method and apparatus for a display of the present embodiment are applied, when a determination is made that the software currently displaying information on the display 5 is software having a function of displaying a map and a function of performing route guidance to a destination, the display form of information provided by the software for communication is determined to be the first display form, while when a determination is made that the software currently displaying information on the display 5 is not the software having the function of displaying the map and the function of performing route guidance to the destination, the display form of information provided by the software for communication is determined to be the second display form. Through this operation, the display form is obtained which does not hide the map display or the route guidance display to the destination, while when the map display or the route guidance display to the destination is not performed, the information provided by the software for communication can be displayed in a display form that allows a sufficient amount of information to be ensured.

In addition, according to the vehicle 1 to which the display control method and apparatus for a display of the present embodiment are applied, when a determination is made that the software currently displaying information on the display 5 is executing a specific function, the display form of information provided by the software for communication is determined to be the first display form, while when a determination is made that the software currently displaying information on the display 5 is not executing the specific function, the display form of information provided by the software for communication is determined to be the second display form. Through this operation, the display form is obtained which does not hide the display in the case of executing the specific function, while when the display in the case of executing the specific function is not performed, the information provided by the software for communication can be displayed in a display form that allows a sufficient amount of information to be ensured.

Moreover, according to the vehicle 1 to which the display control method and apparatus for a display of the present embodiment are applied, when a determination is made that the software currently displaying information on the display 5 is executing the function of performing route guidance to the destination, the display form of information provided by the software for communication is determined to be the first display form, while when a determination is made that the software currently displaying information on the display 5 is not executing the function of performing route guidance to the destination, the display form of information provided by the software for communication is determined to be the second display form. Through this operation, the display form is obtained which does not hide the map display or the route guidance display to the destination, while when the map display or the route guidance display to the destination is not performed, the information provided by the software for communication can be displayed in a display form that allows a sufficient amount of information to be ensured.

Furthermore, according to the vehicle 1 to which the display control method and apparatus for a display of the present embodiment are applied, when the display form of information provided by the software for communication is stored in association with the software currently displaying information on the display, the phone call or message reception provided by the software for communication is detected, and when the phone call or message reception provided by the software for communication is detected, the software currently displaying information on the display is detected, the display form of information provided by the software for communication and stored in association with the software currently displaying information on the display is acquired, and the display form of information provided by the software for communication is determined to preferentially be the acquired display form stored in association with the software currently displaying information on the display. Through this operation, when the display form of information provided by the software for communication is stored in association with the software currently displaying information on the display, the information provided by the software for communication can be displayed in a display form that is suitable for the software currently displaying information on the display.

In addition, according to the vehicle 1 to which the display control method and apparatus for a display of the present embodiment are applied, when the display form of information provided by the software for communication with respect to the software currently displaying information on the display is set by a user who uses the software, the display form of information provided by the software for communication is determined to preferentially be the display form of information provided by the software for communication with respect to the software currently displaying information on the display. The display form is set by the user who uses the software. Through this operation, the display form of information provided by the software for communication can be obtained in accordance with the user's preference.

Moreover, according to the vehicle 1 to which the display control method and apparatus for a display of the present embodiment are applied, a determination is made as to whether or not the software currently displaying information on the display is executing the function of performing route guidance to the destination, and when a determination is made that the software is executing the function of performing route guidance to the destination, the display position of information provided by the software for communication is set to a position that does not interfere with the display position of the route guidance. Through this setting, the information provided by the software for communication does not interfere with at least the display position of the route guidance, and the driver can therefore recognize the travel route ahead from the display on the display 5.

Furthermore, according to the vehicle 1 to which the display control method and apparatus for a display of the present embodiment are applied, when a determination is made that the autonomous travel control function is being executed, the display form of information provided by the software for communication is determined to preferentially be the second display form. Through this operation, when the driving load on the driver is relatively small, it is possible to display a sufficient amount of information regarding the information provided by the software for communication.

In addition, according to the vehicle 1 to which the display control method and apparatus for a display of the present embodiment are applied, the information provided by the software for communication and displayed in the second display form is set with a great number of optional operations of the software for communication or a great deal of attribute information of the person on the other end of the line as compared with when displayed in the first display form. Through this setting, it is possible to display an even more sufficient amount of information regarding the information provided by the software for communication.

DESCRIPTION OF REFERENCE NUMERALS

1 Vehicle
2 Navigation device
21 Map database
22 Television device
23 Radio device
24 Audio player
3 Vehicle control device
31 Vehicle information acquisition unit
32 Warning information acquisition unit 4 Communication device
41 Telephone set
42 Mailer
43 Web browser
Display
51 Rendering controller
52 Map information
53 Mark indicating current position of subject vehicle
54 Enlargement/reduction button
55 Compass
56 Channel selection button
57 Frequency increase/decrease switch
58 Scan button
59 Frequency and program name of currently selected broadcasting station
6 Speaker
61 Audio output controller
7 Microphone
71 Voice input controller
8 Display controller
P1, P3 Incoming call information
P2, P4 In-call formation
P5 Reception information
P6 Content of message

The invention claimed is:

1. A display control method for a display, the display operating to:
   display information provided by at least one software component among a plurality of software components including a software component having a function of displaying a map and a function of performing route guidance to a destination; and
   display information provided by a software component for communication having at least one function of a talk or message reception while displaying the information provided by the at least one software component, the display control method comprising:
   detecting a phone call or message reception provided by the software component for communication;
   when detecting the phone call or message reception, detecting a software component that is currently displaying information on the display; and
   determining, in accordance with the software component that is currently displaying information on the display, a display form of information provided by the software component for communication to be either a first display form of displaying the information in a part of a display region of the software component that is currently displaying information on the display or a second display form in which a display area is larger than that of the first display form.

2. The display control method for a display according to claim 1, comprising:
   determining whether or not the software component that is currently displaying information on the display is a software component in which display of the information is prioritized as compared with the software component for communication;
   when determining that the software component that is currently displaying information on the display is the software component in which display of the information is prioritized, determining the display form of information provided by the software component for communication to be the first display form; and
   when determining that the software component that is currently displaying information on the display is not the software component in which display of the information is prioritized, determining the display form of information provided by the software component for communication to be the second display form.

3. The display control method for a display according to claim 1, comprising:
   determining whether or not the software component that is currently displaying information on the display is the software component having the function of displaying the map and the function of performing route guidance to the destination;
   when determining that the software component that is currently displaying information on the display is the software component having the function of displaying the map and the function of performing route guidance to the destination, determining the display form of information provided by the software component for communication to be the first display form; and
   when determining that the software component that is currently displaying information on the display is not the software component having the function of displaying the map and the function of performing route guidance to the destination, determining the display form of information provided by the software component for communication to be the second display form.

4. The display control method for a display according to claim 1, comprising:
   determining whether or not the software component that is currently displaying information on the display is executing a specific function;
   when determining that the software component that is currently displaying information on the display is executing the specific function, determining the display form of information provided by the software component for communication to be the first display form; and
   when determining that the software component that is currently displaying information on the display is not executing the specific function, determining the display form of information provided by the software component for communication to be the second display form.

5. The display control method for a display according to claim 1, comprising:
   determining whether or not the software component that is currently displaying information on the display is executing the function of performing route guidance to the destination in the software component having the function of displaying the map and the function of performing route guidance to the destination;
   when determining that the software component that is currently displaying information on the display is executing the function of performing route guidance to the destination, determining the display form of information provided by the software component for communication to be the first display form; and
   when determining that the software component that is currently displaying information on the display is not executing the function of performing route guidance to the destination, determining the display form of information provided by the software component for communication to be the second display form.

6. The display control method for a display according to claim 1, comprising:
   when the display form of information provided by the software component for communication is stored in association with the software component that is currently displaying information on the display, detecting the phone call or message reception provided by the software component for communication;

when detecting the phone call or message reception provided by the software component for communication, detecting the software component that is currently displaying information on the display;

acquiring the display form of information provided by the software component for communication and stored in association with the software component that is currently displaying information on the display; and determining the display form of information provided by the software component for communication to preferentially be the acquired display form stored in association with the software component that is currently displaying information on the display.

7. The display control method for a display according tos claim 1, comprising:

when the display form of information provided by the software component for communication with respect to the software component that is currently displaying information on the display is set by a user who uses the software component, determining the display form of information provided by the software component for communication to preferentially be the display form of information provided by the software component for communication with respect to the software component that is currently displaying information on the display, the display form being set by the user who uses the software component.

8. The display control method for a display according to claim 1, comprising:

determining whether or not the software component that is currently displaying information on the display is executing the function of performing route guidance to the destination; and when determining that the software is executing the function of performing route guidance to the destination, setting a display position of information provided by the software component for communication to a position that does not interfere with a display position of the route guidance.

9. The display control method for a display according to claim 1, wherein the display is equipped in a vehicle having an autonomous travel control function, and the display control method comprises:

determining whether or not the autonomous travel control function is being executed; and when determining that the autonomous travel control function is being executed, determining the display form of information provided by the software component for communication to preferentially be the second display form.

10. The display control method for a display according to claim 1, wherein the information provided by the software component for communication is either information indicating that the phone call is received or information indicating that the talk is being held.

11. The display control method for a display according to claim 1, wherein the information provided by the software component for communication and displayed in the second display form is set with a great number of optional operations of the software component for communication or a great deal of attribute information of a person on another end of a line as compared with when displayed in the first display form.

12. The display control method for a display according to claim 1, wherein when the information provided by the software component for communication is displayed in the second display form, the information is displayed in a state in which an operation of the software component that is currently displaying information on the display is not possible.

13. The display control method for a display according to claim 1, wherein the information provided by the software component for communication is displayed as a sub screen on a layer above a display screen displayed by the software component that is currently displaying information on the display.

14. A display control apparatus for a display, comprising a processor configured to:

display information provided by at least one software component among a plurality of software components including a software component having a function of displaying a map and a function of performing route guidance to a destination; and display information provided by a software component for communication having at least one function of a talk or message reception while displaying the information provided by the at least one software component, the processor operating to:

detect a phone call or message reception provided by the software component for communication;

when detecting the phone call or the message reception, detect a software component that is currently displaying information on the display; and determine, in accordance with the software component that is currently displaying information on the display, a display form of information provided by the software component for communication to be either a first display form of displaying the information in a part of a display region of the software component that is currently displaying information on the display or a second display form in which a display area is larger than that of the first display form.

* * * * *